March 9, 1965 J. S. PICTON 3,172,819
FLOW RESTRICTOR FOR A FUEL CHANNEL IN A NUCLEAR REACTOR
Filed March 27, 1961

INVENTOR
James S. Picton
BY
ATTORNEY

United States Patent Office 3,172,819
Patented Mar. 9, 1965

3,172,819
FLOW RESTRICTOR FOR A FUEL CHANNEL
IN A NUCLEAR REACTOR
James S. Picton, London, England, assignor to Babcock &
Wilcox Limited, London, England, a company of Great
Britain
Filed Mar. 27, 1961, Ser. No. 98,479
Claims priority, application Great Britain, Apr. 1, 1960,
11,695/60
5 Claims. (Cl. 176—31)

This invention relates to gas-cooled nuclear reactors and more particularly to a flow restrictor for gas-cooled nuclear reactors which are to be refueled while under load and are of the kind having upright fuel channels arranged for upward flow of coolant and upward withdrawal of fuel elements.

In such a nuclear reactor, when, with the reactor in operation, the fuel elements are removed from a fuel channel, the flow of coolant through the channel is increased while the heat input to the coolant flowing through the channel is decreased. As a resultant disadvantage the coolant leaving the channel at a relatively high rate is at a relatively low temperature.

The coolant pressure drop across the core of the nuclear reactor tends to increase with the rating of the core and in a sufficiently highly rated core the difficulty arises that as fuel elements are removed from a fuel channel a condition is reached such that the upward force due to coolant differential pressure acting on a fuel element or fuel elements is sufficient to effect lifting thereof. The fuel element support itself may also be lifted due to the differential pressure acting thereon. As a result of lifting of a fuel element or fuel elements or/and the support damage may occur.

The present invention includes a gas-cooled nuclear reactor which is to be refuelled while under load and has upright fuel channels arranged for upward flow of coolant and upward withdrawal of fuel elements, in which fuel channels are provided with respective movable coolant flow restrictor members each of which is normally maintained in an inoperative position by a force due to gravity acting upon a fuel element or fuel elements in the associated fuel channel, but which upon the said element or elements being lifted is moved by differential pressure thereon of the coolant flowing through the channel to a restricting position in which it serves to limit the rate of coolant flow through the channel.

The invention also includes a gas-cooled nuclear reactor which is to be refuelled while under load and has upright fuel channels arranged for upward flow of coolant and upward withdrawal of fuel elements, in which fuel channels are provided with respective coolant flow restrictor each of which is normally maintained in an inoperative position by a fuel element or fuel elements resting on a fuel element support of the channel and is arranged in the event of upward movement of a superincumbent fuel element or superincumbent fuel elements under the action of differential coolant pressure to be moved to a restricting position in which the differential pressure acting on the restrictor member exerts a force which is at least sufficient to and serves to support the fuel element or fuel elements and in which the restrictor member serves to limit the differential coolant pressure acting on the fuel element or fuel elements to a value insufficient to effect lifting thereof against the force of gravity.

The invention also includes a flow restrictor for use in nuclear reactors of the kind in question.

Thus the invention includes a flow restrictor for effecting limitation of flow of coolant upwardly in a fuel channel of a gas-cooled nuclear reactor during refuelling of the channel from above while the reactor is in operation, including a base member of sleeve-like form, a pillar upstanding from the base member for supporting a superjacent fuel element and a restrictor member having a lower or inoperative position and a higher or restricting position adapted to be biassed to the restricting position by differential pressure of coolant flowing therepast and provided at the lower end of a spindle which is arranged to slide within the pillar and the upper end of which, when the restrictor member is in the inoperative position, is adapted to engage a fuel element supported by the pillar.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The invention will now be described, by way of example, with reference to the accompanying partly diagrammatic drawings, in which.

Figure 1:
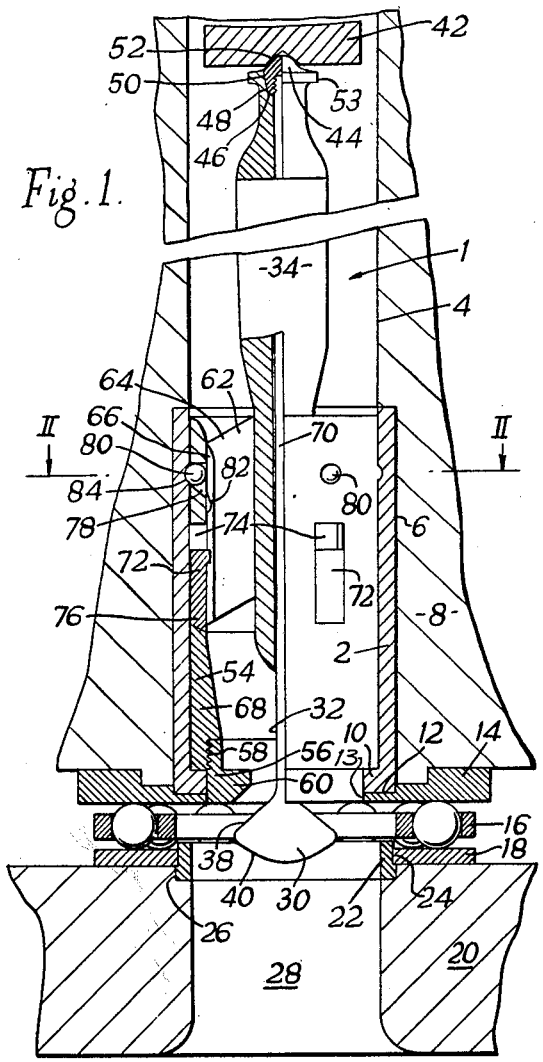
FIGURE 1 is a fragmentary sectional elevation through the lower part of a nuclear reactor core and core support showing, with the left hand half thereof in part section, a fuel element support and a restrictor member, part of the fuel element support and core being omitted, together with a lower part of a superincumbent fuel element shown in sectional elevation.
Figure 2:
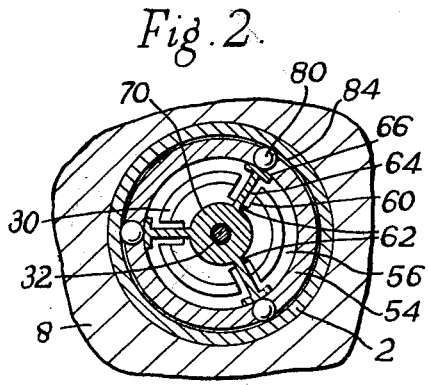
FIGURE 2 is a sectional plan view taken on the line II—II of FIGURE 1.

Referring to FIGURES 1 and 2 of the drawings, a fuel element support 1 is positioned in an end fixture 2 of hollow cylindrical form having an internal diameter equal to that of a fuel channel 4, the end fixture 2 being accommodated in an annular recess 6 in a graphite core 8 at the lower end of the fuel channel 4 and being formed at its lower end with an internal annular flange 10. At its lower end the end fixture 2 fits within an annular recess 12 surrounding an aperture 13 of a plate 14 serving to support the column of graphite blocks defining the fuel channel 4. The plate 14 rests upon a ball bearing 16 having a lower plate 18 resting upon a support grid 20 for the core 8 and located by a ring 22 which fits through an aperture 24 in the lower plate 18 and is seated within an annular recess 26 at the top of an aperture 28 in the support grid 20 for the passage of coolant to the fuel channel 4.

A restrictor member 30 is provided on a spindle 32 arranged to slide within an upwardly extending pillar 34 forming part of a fuel element support 1. The restrictor member 30 and its spindle 32 and the pillar 34 are positioned co-axially with the fuel channel 4 and the restrictor member is formed with an upper surface 38 of frusto-conical form and a lower convex surface 40, the arrangement being such as to promote smooth flow of the coolant past the restrictor when in the inoperative position shown in FIGURE 1. When the restrictor member is in its inoperative position there is a small pressure drop across the member sufficient to initiate upward movement thereof when a superjacent fuel element 42 starts to rise. At its upper end the spindle 32 is provided with a support flange 44 having a lower annular face 46 normal to the axis of the spindle 32 and a downwardly tapering side face 48 of frusto-conical form adapted to engage a complementary surface 50 of a recess at the top of the pillar 34 and an upper face 52 of dome-like form which projects above an annular flange 53 forming the upper extremity of the pillar. When the support flange 44 at the top of the spindle 32 rests on the pillar 34 the restrictor member 30 is in its inoperative position shown in FIGURE 1.

Positioned within the end fixture 2 is a retaining cylinder or base member 54 of sleeve-like form, and screwed into an internally threaded recess 58 at the lower end is an externally threaded portion of an annular part 56 which co-operates with the restrictor member 30 in defining the coolant flow path past the restrictor member. A lower portion of the annular part 56 fits within the annular flange 10 at the bottom of the end fixture 2 and within the apertures 13 of the plate 14, and is formed with a rounded lower radially inner edge. Stop means limiting the upward movement of the restrictor member 30 to a restricting position are constituted by three, equiangularly, peripherally distributed, radially inwardly extending projections 60 on the annular part 56, lower edges of the projections sloping upwardly in a radially inward direction to conform with the upper sloping surface 38 of the restrictor member 30.

The base member 54 which rests on the annular flange 10 of the end fixture 2, serves to support the pillar 34 by means of a three-armed spider 62 having arms in the form of thin, vertically elongated webs 64 flanged at their radially outer edges 66. The base member 54, over a portion 68 extending from the annular part 56 to a location adjacent the lower end of a hub 70 of the spider 62, flares upwardly to help in giving a smooth flow of the coolant and adequate passageway past the spider. The hub 70 of the spider 62 is of smaller diameter than the main part of the pillar 34, the part of the spider 62 above the webs 64 gradually increasing in diameter while the base member 54 is formed with an outwardly flared upper end.

Welded to each spider web 64 and extending adjacent a lower part of the flanged edge 66 thereof is a shoe 72 arranged to slide between upper and lower limits within a slot 74 extending vertically in the wall of the base member 54. The lower ends 76 of the shoes 72 are formed with downwardly and radially inwardly sloping surfaces which by engaging complementary surfaces at the lower ends of the slots tend to exert a centralizing action on the spider 64. At a short distance above each slot, and in line therewith, the wall of the base member 54 is formed with an aperture 78 for housing a spherical steel ball 80. A lower surface of the aperture 78 slopes downwardly in a radially inward direction and the aperture is of such size that the ball 80 is able to project outwardly but is unable to pass through the aperture. Each web 64 is provided on its outer edge 66 with a recess 82 adapted to permit radially inward movement of the associated ball 80 when the shoe 72 engages the top of the slot in which it slides. It follows that when the shoe 72 is in engagement with the bottom of the associated slot 74 the recess 82 in the web 64 is located below the ball 80. The end fixture 2 towards the top thereof is formed with an internal peripheral recess 84 which is immediately opposite the balls 80 when the base member 54 rests on the annular flange 10 of the end fixture 2.

With the base member 54 resting on the annular flange 10 of the end fixture 2 and the pillar 34 supported by the shoes 72 resting on the lower ends of the slots 74 in the base member 54, the edge parts 66 of the spider webs 64 immediately opposite the balls 80 serve to maintain the balls 80 in engagement with the peripheral recess 84 of the end fixture 2, with the result that the fuel element support 1 is locked to the end fixture 2 and upward movement of the support due to differential coolant pressure acting thereon is prevented.

Figure 3:
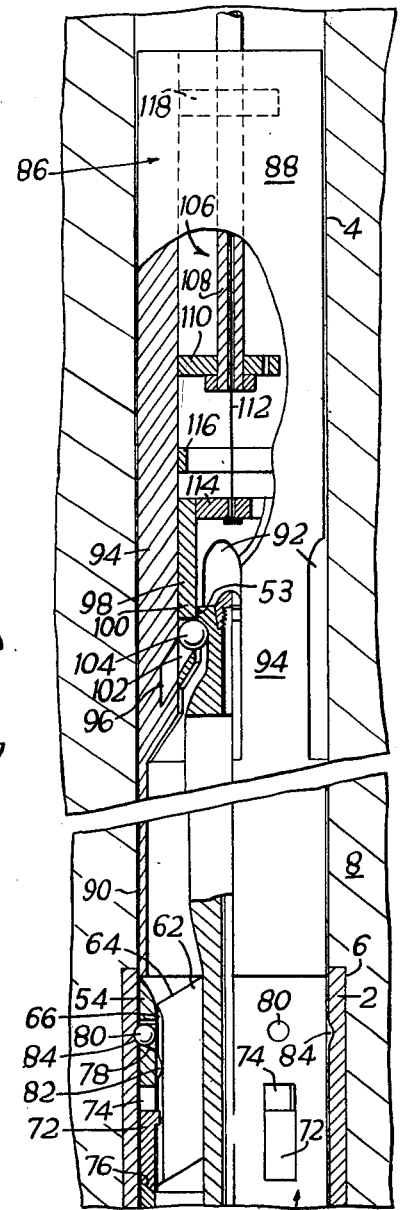
FIGURE 3 is a fragmentary sectional elevation corresponding to the upper part of FIGURE 1 and showing the fuel element support coupled to a grab head the lower left hand half of which is shown in section with a portion of the right hand half broken away.

Referring to FIGURE 3 of the drawings a grab head 86 for removing or inserting the fuel element support 1 includes an outer sleeve 88, arranged to slide within the fuel channel 4, having a lower portion 90 of increased internal diameter the base of which engages the top of the base member 54. An intermediate portion of the outer sleeve 88 is formed with three apertures 92, to permit the flow of coolant through the grab head 86 when the fuel element support 1 is engaged, and, in each of the three lands 94 between the apertures 92, recesses 96. An inner sleeve 98 slides axially within the outer sleeve 88 and is formed with three prongs 100 registering with the lands 94 and each provided with an aperture 102 within which a steel ball 104 is carried. A co-axial operating cable 106 is secured to the grab head with a sheath 108 attached to a web 110 mounted in the outer sleeve 88 and a longitudinally rigid inner cable 112 attached to a web 114 mounted on the inner sleeve 98. A ring 116 mounted within the outer sleeve 88 limits upward movement of the inner sleeve 98 relative to the outer sleeve. The outer sleeve 88 is extended upwardly to add weight to the grab head 86, a web 118 being provided at the supper part thereof to locate the co-axial operating cable 106.

When it is desired to remove the fuel element support from the channel 4, the grab head 86, with the apertures 102 in the inner sleeve 98 and the recesses 96 in the lands 94 in register and the steel balls in an outwardly displaced position, is lowered in the fuel channel until the base of the lower portion 90 engages the top of the base member 54. The inner cable 112 is then operated to raise the inner sleeve 98 relative to the outer sleeve 88 so that the steel balls 104 move inwardly and engage the annular flange 53 on the pillar 34 as shown in FIGURE 3. On continued upward movement of the inner sleeve, until it engages the ring 116, the pillar is drawn upwardly so that the shoes 72 slide to the top of the slots 74 in the base member 54 with the result that the recesses 82 in the outer edges 66 of the spider webs 64 are located inwardly of the respective balls 80 which then move into the recesses, thus releasing the base member 54 from the end fixture 2 and enabling the whole fuel element support 1 to be withdrawn from the fuel channel by operating the co-axial cable 106, the outer sleeve 88 of the grab head 86 being carried on the inner sleeve 98 which, in the lifting position, abuts the ring 116. The lower boundaries of the apertures 78 are formed to assist the inward movement of the balls 80.

The travel of the restrictor member 30 and the travel of the shoes 72 are so related that when the spider 62 reaches a position with the balls 80 in register with the recesses 82 the restrictor member 30 is in the restricting position with the upper surface 38 engaging the inwardly extending projections 60, without impairing the aerodynamic flow path for the coolant.

In order to maintain proper control of the removal of the fuel element support 1 or replacement thereof it is necessary for the weight of the support 1 and the grab head 86 to be greater than the upward force due to differential coolant pressure acting on those members and, if necessary, further weights may be added to the grab head.

In reinserting the fuel element support 1 it is necessary to prevent upward movement of the base member 54 in relation to the spider 62 and consequent jamming of the balls 80 against the wall of the fuel channel 4. To this end the grab head 86 is dimensioned such that the lower portion 90 of the outer sleeve 88 maintains the base member 54 in that position relatively to the pillar 34, which is supported from the inner sleeve 98, in which the balls 80 are entered within the recesses 82 in the edges 66 of the spider 62, the outer sleeve 88 being weighted to overcome the effect of the upward force due to differential coolant pressure upon the fuel element support 1 and grab head 86.

During the replacement of the fuel element support, after the base member 54 has engaged the annular flange 10 of the end fixture 2 the inner cable 112 is operated to lower the inner sleeve 98 and the pillar 34, the continued downward movement of the pillar 34 under the force of gravity serving to move the balls 80 outwardly into the peripheral recess 84 of the end fixture 2. The pillar 34, which has a smooth profile, causes a low pressure drop even with normal coolant flows and the weight of the pillar 34 and spider 62 is sufficient to provide an adequate downward load to force out the balls 80 into the peripheral recess 84 of the end fixture 2. Hence, by permitting downward movement of the pillar 34, the base member 54 is locked in position, and, upon further downward movement of the inner sleeve 98, the steel balls 104 move to the outwardly displaced position in the recesses 96 whereupon the grab head 86 may be withdrawn. Once the base member 54 is locked in position any upward force acting thereon serves to force the balls 80 against the edges 66 of the spider webs 64 so that the latter are frictionally held.

During a refuelling operation, as fuel elements are removed from the fuel channel the rate of coolant flow increases until the differential coolant pressure across the remaining element or elements is sufficient to effect lifting thereof, whereupon the restrictor member 30 is no longer held by the fuel element or elements in its inoperative position and the restrictor member 30 moves to its restricting position in which the greater part of the coolant pressure drop occurring across the nuclear reactor core takes place at the restricted annular throat between the restrictor member 30 and the annular part 56. It will be understood that if the differential pressure across the remaining fuel element is insufficient to effect lifting thereof, the restrictor member 30 will move to the restricting position upon removal of the remaining fuel element. The coolant flow through the fuel channel 4 is therefore restricted substantially to a predetermined value at which the differential coolant pressure acting on the fuel element or fuel elements is not sufficient to raise them against the force of gravity but is sufficient to support most of the weight thereof. The fuel element or elements therefore rest upon the support flange 44 at the upper end of the spindle, the differential coolant pressure acting upon the restrictor member 30 exerting a sufficient upthrust to support the residual weight of the fuel element or elements through the spindle. In the restricting position the restrictor member 30 limits the flow of coolant through the channel, so that the rate of flow of coolant at low temperature from the channel compared with the temperature of coolant from charged channels is substantially reduced during operations involving the removal or insertion of fuel elements compared with the rate of flow of coolant during those operations in which no restriction of the flow is effected.

Advantageously the fuel element support pillar incorporates a shock absorber adapted to dissipate kinetic energy of a fuel element inadvertently dropped thereon of a form described in the copending application of James S. Picton et al., Serial No. 63,906, filed October 20, 1960, by the common assignee.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A gas-cooled nuclear reactor arranged to be refueled under load comprising walls forming upright fuel channels, upwardly extending fuel elements disposed within said fuel channels, said fuel elements disposed within said fuel channels and arranged to be upwardly withdrawn therefrom, movable coolant flow restrictor assemblies located within said fuel channels and positioned beneath said fuel elements, said restrictor assemblies comprising a restrictor mmeber held in a normally inoperative position by the downward force of at least one said fuel element contacting and acting downwardly upon the restrictor assembly, inwardly directed projections in the lower end of said channel above said restrictor member to provide a stop therefor, said flow restrictor members being moved into operative restricting position by the action of the differential pressure of the reactor coolant acting thereon as it flows upwardly through said fuel channels when said fuel elements are lifted upwardly out of contacting engagement with said restrictor assemblies, when situated in the restricting position said flow restrictor members serve to limit the rate of flow of coolant through said channels.

2. A nuclear reactor as set forth in claim 1 wherein a removable fuel element support comprising a base part and an upwardly extending part is positioned within said fuel channel carrying said restrictor member, and holding means associated with said support preventing upward movement of said support due to differential coolant pressure acting thereon, said holding means releasable by drawing said upwardly extending part of said support upwardly in relation to said base part thereof.

3. A nuclear reactor as set forth in claim 2 wherein said fuel element support comprises relatively axially movable parts and securing means, a fixed part within said fuel channel having a cylindrical inner surface and an internal annular recess within said inner surface, said securing means engageable within the internal annular recess of said fixed part, whereby downward and upward movements of said upwardly extending part relative to the other part of said support are respectively adapted to render said securing means effective and ineffective.

4. A nuclear reactor as set forth in claim 3 wherein an upwardly extending pillar forms part of said restrictor assembly, a spindle connected to said restrictor member and arranged to slide within said pillar whereby when said pillar supports said fuel element said spindle abuts against said fuel element so that said restrictor member is prevented from rising from its inoperative to its restricting position.

5. A nuclear reactor as set forth in claim 4 wherein an annular part co-operates with said restrictor member defining the coolant flow path past said restrictor member.

References Cited in the file of this patent
UNITED STATES PATENTS

| | | |
|---|---|---|
| 2,652,067 | Hosking | Sept. 15, 1953 |
| 2,782,158 | Wheeler | Feb. 19, 1957 |
| 2,877,170 | Greenhalgh et al. | Mar. 10, 1959 |
| 2,915,446 | Liljeblad | Dec. 1, 1959 |